United States Patent
Chow

(10) Patent No.: US 6,288,318 B1
(45) Date of Patent: Sep. 11, 2001

(54) APPARATUS FOR AND A METHOD OF PROCESSING ANALOGUE AUDIO SIGNALS

(76) Inventor: Kar Ming Chow, 13N Braemar Terrace, 1 Pak Fuk Road, North Point, Hong Kong (HK)

(*) Notice: Subject to any disclaimer, the term of this patent is extended or adjusted under 35 U.S.C. 154(b) by 0 days.

(21) Appl. No.: 09/574,073

(22) Filed: May 18, 2000

(30) Foreign Application Priority Data

May 20, 1999 (GB) .................................................. 9911778

(51) Int. Cl.[7] .............................. G09B 15/04; G10H 1/00
(52) U.S. Cl. ........................................ 84/603; 84/477 R
(58) Field of Search ................................ 84/454, 477 R, 84/DIG. 18, 603

(56) References Cited

U.S. PATENT DOCUMENTS

| | | |
|---|---|---|
| 4,441,399 | 4/1984 | Wiggins et al. . |
| 4,754,680 * | 7/1988 | Morikawa et al. ............. 84/477 R X |
| 5,237,124 * | 8/1993 | Tabei ............................. 84/477 R X |
| 5,475,390 * | 12/1995 | Morikawa et al. ............. 84/477 R X |
| 5,563,358 | 10/1996 | Zimmerman . |
| 5,585,583 * | 12/1996 | Owen ................................. 84/454 X |
| 5,750,912 | 5/1998 | Matsumoto . |

FOREIGN PATENT DOCUMENTS

| | | |
|---|---|---|
| 0504684A2 | 9/1992 | (EP) . |
| WO93/17408 | 9/1993 | (WO) . |
| WO98/49670 | 11/1998 | (WO) . |

* cited by examiner

Primary Examiner—Stanley J. Witkowski
(74) Attorney, Agent, or Firm—Burns, Doane, Swecker & Mathis, L.L.P.

(57) ABSTRACT

An apparatus (10) for processing at least one analogue audio signal, including means (24) for receiving a first analogue audio signal, means (48) for converting said first analogue signal into a first digital signal, means for comparing said first digital signal with data representing musical notes, means (44) for selecting a datum representing a reference musical note from said data representing musical notes on the basis of result of comparing said first digital signal with said data representing musical notes, means (62) for converting said datum into a second analogue audio signal, means (28) for outputting said second analogue audio signal, and means (32) for visually representing said second analogue audio signal. There is also disclosed a method of processing at least one analogue audio signal, including the steps of (a) receiving a first analogue audio signal; (b) converting said first analogue audio signal into a first digital signal; (c) comparing said first digital signal with data representing musical notes; (d) selecting a datum representing a reference musical note from said data representing musical notes on the basis of result of comparing said first digital signal with said data representing musical notes; (e) converting said datum into a second analogue audio signal; (f) outputting said second analogue audio signal; and (g) visually representing said second analogue audio signal.

17 Claims, 7 Drawing Sheets

APPARATUS FOR AND A METHOD OF PROCESSING ANALOGUE AUDIO SIGNALS

This application claims priority under 35 U.S.C. §§119 and/or 365 to 991178.0 filed in United Kingdom on May 20, 1999; the entire content of which is hereby incorporated by reference.

This invention relates to an apparatus for and a method of processing analogue audio signals and, in particular, such an apparatus for and a method of receiving external analogue audio signals, processing such signals and subsequently outputting the processed signals in the form of sound and/or visual representations.

BACKGROUND OF THE INVENTION

People who are fond of singing may also wish to compose songs, whether for themselves or others. However, for people not trained in singing, the notes which they sing may not be in the correct pitch. There are existing equipment, e.g. cassette tape recorders, which allows a user to input audio signals (sound) to a cassette tape by singing into a microphone connected to the cassette tape recorder. However, the song reproduced by the cassette tape recorder is intended to be the same as the one recorded. If, therefore, the singer does not sing to the correct pitch such will be clearly reflected when reproduced by the cassette tape recorder. In addition, for people not trained in musical theory, they may not know how to correctly represent what they are singing.

It is an object of the present invention to provide an apparatus for and a method of processing analogue audio signals to cater for the aforesaid shortcomings, or at least to provide a useful alternative to the public.

It is a further object of the present invention to provide an apparatus for and method of processing analogue audio signals in which the outputted audio analogue signals correspond to the respectively correct pitch.

It is a yet further object of the present invention to provide an apparatus for and method of processing analogue audio signals in which the outputted analogue audio signals are visually represented, so as to allow the user to represent the inputted song in written form.

SUMMARY OF INVENTION

According to a first aspect of the present invention, there is provided an apparatus for processing at least one analogue audio signal, including means for receiving a first analogue audio signal, means for converting said first analogue signal into a first digital signal, means for comparing said first digital signal with data representing musical notes, means for selecting a datum representing a reference musical note from said data representing musical notes on the basis of result of comparing said first digital signal with said data representing musical notes, means for converting said datum into a second analogue audio signal, means for outputting said second analogue audio signal, and means for visually representing said second analogue audio signal.

According to a second aspect of the present invention, there is provided a method of processing at least one analogue audio signal, including the steps of (a) receiving a first analogue audio signal; (b) converting said first analogue audio signal into a first digital signal; (c) comparing said first digital signal with data representing musical notes; (d) selecting a datum representing a reference musical note from said data representing musical notes on the basis of result of comparing said first digital signal with said data representing musical notes; (e) converting said datum into a second analogue audio signal, (f) outputting said second analogue audio signal, and (g) visually representing said second analogue audio signal.

BRIEF DESCRIPTION OF THE DRAWINGS

An embodiment of the invention will now be described by way of an example, and with reference to the accompanying drawings, in which.

DETAILED DESCRIPTION OF THE PREFERRED EMBODIMENT

Figure 1:
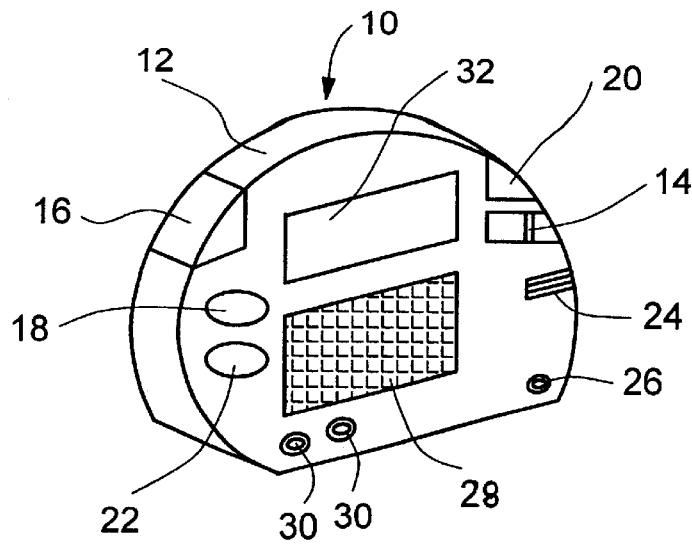
FIG. 1 is a front perspective view of an apparatus for processing analogue audio signals according to the present invention.

Referring first to FIG. 1, such shows an apparatus for processing analogue audio signals according to the present invention, as generally designated as 10. The apparatus 10 includes a generally oval-shaped body 12. Provided on the body 12 is a on/off switch 14 which is operable to activate or de-activate the apparatus 10. In this connection, the apparatus 10 is powered by one or more dry electric batteries (not shown). The apparatus 10 also includes a play button 16 for outputting the processed analogue audio signals. If the user wish to hear the analogue audio signals as actually inputted in the apparatus, such is achieved by pressing a re-play button 18. A record button 20 is operable to activate the recording function, thus allowing inputting of analogue audio signals for processing. A memory button 22 is also operable to provide further memory space for the last sequence of analogue audio signals inputted into the apparatus 10.

An in-built microphone 24 is provided on the body 12 of the apparatus 10 so as to allow the input of analogue audio signals. Analogue audio signals may also be inputted via an external microphone (not shown) connected to the apparatus 10 via an external microphone socket 26.

Audio signals may be outputted by the apparatus 10 via an in-built speaker 28, or by external audio equipment (not shown) connected to the apparatus 10 via a pair of audio output sockets 30. Audio signals so outputted by the apparatus 10 may also be visually represented by a liquid crystal display (LCD) 32, in a manner to be discussed below.

Figure 2:
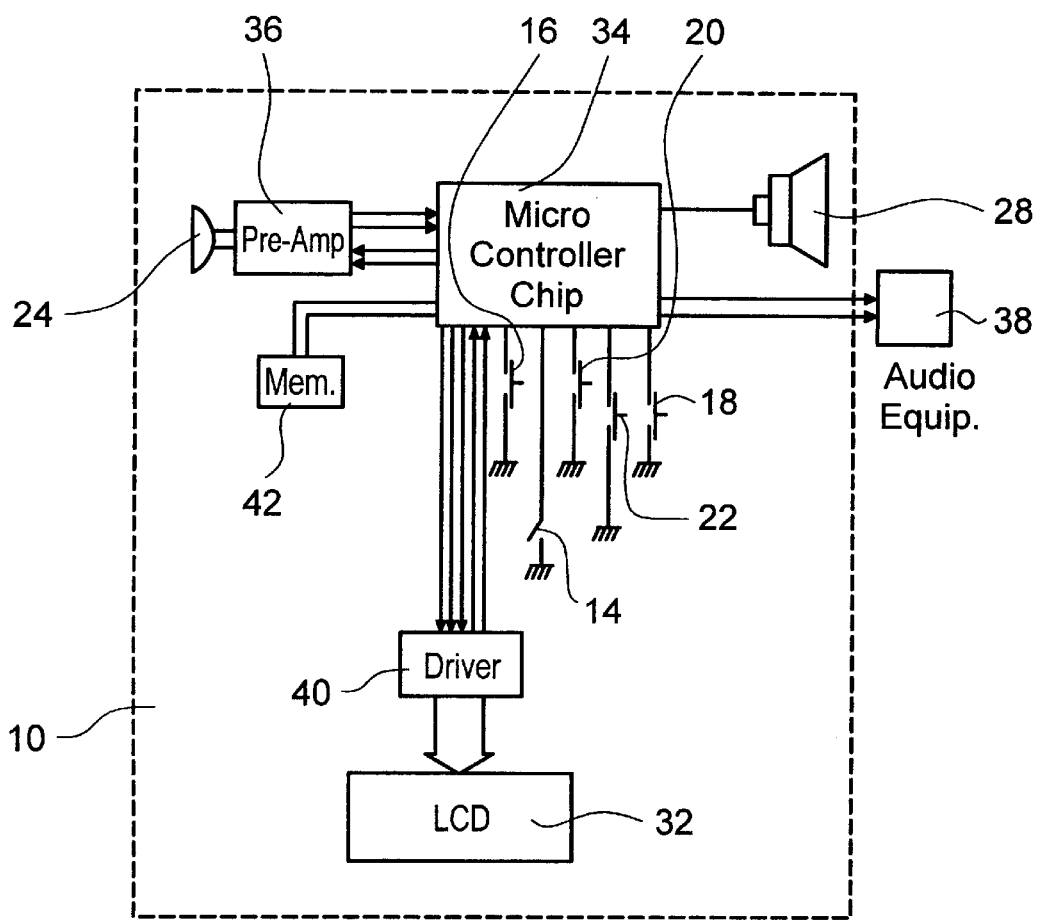
FIG. 2 is a block diagram of the apparatus shown in FIG. 1.

As shown in FIG. 2, the apparatus 10 includes a chip/integrated circuit 34. An appropriate chip 34 may be serial No. RSC-164 or RSC-264T from the Interactive Speech™ family of Sensory, Inc. of Sunnyvale, U.S.A The present invention will henceforth be described with serial No. RSC-164 as the chip 34, although it should be understood that such only serves as an example and that there are other suitable chips.

Audio signals received by the microphone 24 are first amplified by a pre-amplifier and gain control 36 before inputting into the chip 34. The on/off switch 14, the play button 16, the re-play button 18, the record button 20 and the memory switch 22 are electrically connected to the chip 34 for controlling the operation of the apparatus 10. As mentioned above, audio signals from the apparatus 10 may be transmitted to an external audio equipment 38 for output. The chip 34 is also connected to a liquid crystal display (LCD) driver/controller 40 for driving the LCD 32. A flash memory 42 is also connected to the chip 34.

Figure 3:
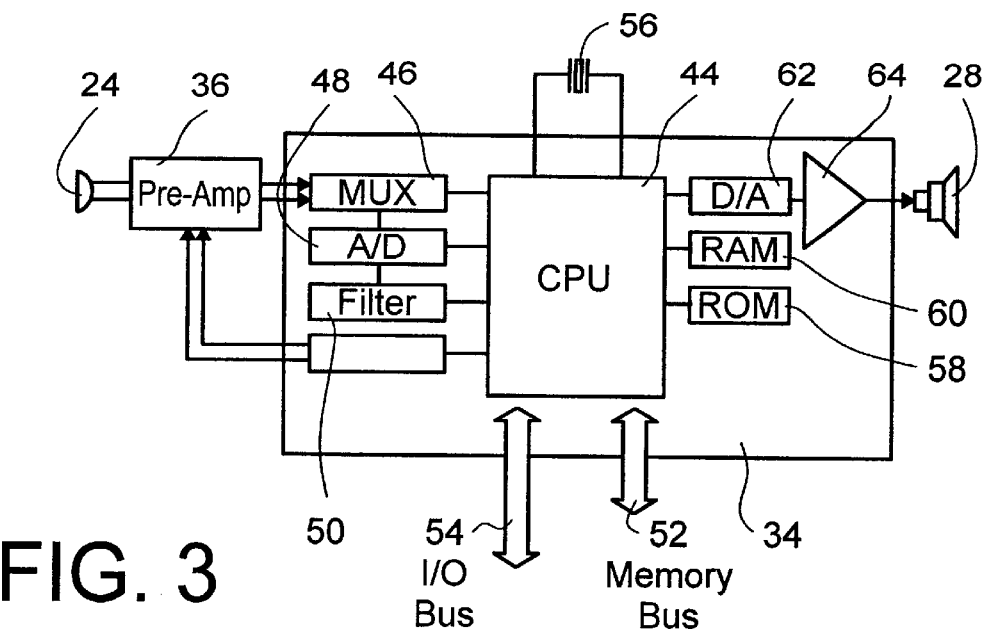
FIG. 3 is a block diagram of the chip shown in FIG. 2.

FIG. 3 shows a block diagram of the chip 34. The chip 34 includes a 4 MIPS 8-bit microcontroller 44 for controlling the operation of the chip 34. The chip 34 delivers MIPS of integer performance at 14.32 MHz. In particular, the central processing unit (CPU) embedded in the chip 34 is an 8-bit, variable-length-instruction, microcontroller 44. Audio signals received into the chip 34 are first manipulated by a multiplexer 46, then converted into corresponding digital signals by an analogue-to-digital converter 48, and then through a digital logic filter 50, before entering the microcontroller 44. The microcontroller 44 is connected via a memory bus 52 (comprising a 16-bit address bus and an 8-bit data bus) to an external memory (e.g. the flash memory 42 as shown in FIG. 2, or an SRAM). Signals may be inputted into or outputted from the microcontroller 44 via various input/output buses 54. The microcontroller 44 is connected to an oscillator 56, which acts as an 32 kHz clock for time keeping. There are also provided within the chip 34 a 64 kbyte read only memory (ROM) 58 and a 384 byte random access memory (RAM) 60.

When the inputted audio signals are converted by the analogue-to-digital converter 48 into digital signals, and subsequently inputted into the microcontroller 44, such digital signals are compared with data representing musical notes stored in the ROM 58. A range of tolerance (e.g. ±10%) is allowed whereby digital signals within the tolerance range of stored data will be treated as that particular data, and will thus be subsequently outputted as the musical note represented by the particular data. As an example, if a user inputs/sings a note of a pitch very close to middle C, the audio signals produced by him/her will be converted into digital signals and compared with digital data already stored in the ROM 58. Upon comparison, it will be found that the inputted note is middle C (although the actual inputted note may actually be slightly higher or lower than middle C). The data representing middle C will then be stored in the RAM 60 for subsequent output. In particular, the 384 bytes of the RAM 60 are organized as a Register Space.

When the whole tune or melody is completely inputted into the chip 34, duly processed by the microcontroller 44, and the relevant data stored in the RAM 60, the data may then be converted into audio signals by a digital-to-analogue converter 62. In particular, the digital-to-analogue converter 62 output provides a general purpose 10-bit analogue output that may then be amplified by an amplifier 64 before being outputted by the speaker 28.

Figure 4:
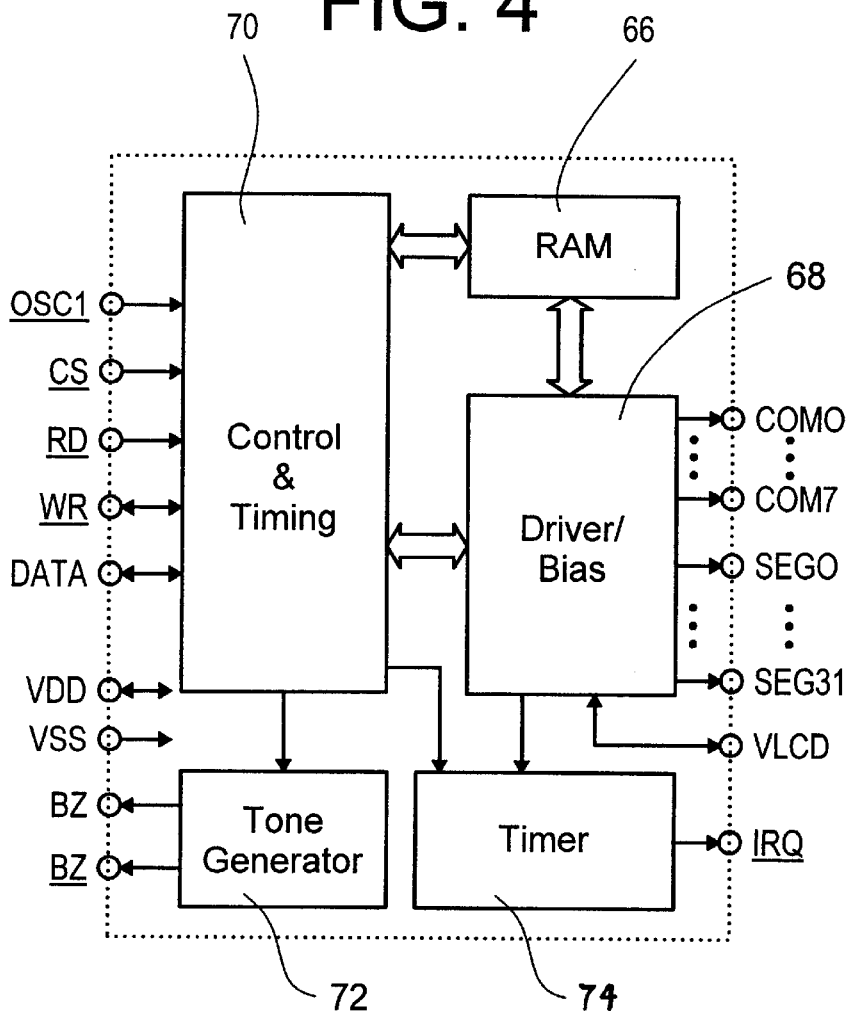
FIG. 4 is a block diagram of the liquid crystal display (LCD) driver shown in FIG. 2.

FIG. 4 is a block diagram of the liquid crystal display (LCD) driver/controller 40 as shown in FIG. 2. An appropriate LCD driver may be one traded under serial No. HT1622 by Holtek Semiconductor inc. of Taiwan. It should of course be understood that such is only an example of a suitable LCD driver, and that other LCD drivers may also be used. This LCD driver/controller 40 is a 256 (32×8) pattern, memory mapping, and multi-function LCD controller, with a built-in 32×8 bit display RAM 66, an LCD driver/bias circuit 68, a control and timing circuit 70, a tone frequency generator 72, and a watch dog timer and time base generator 74. The maximum display segment of the LCD driver/controller 40 are 256 patterns (32×8).

Figure 5:
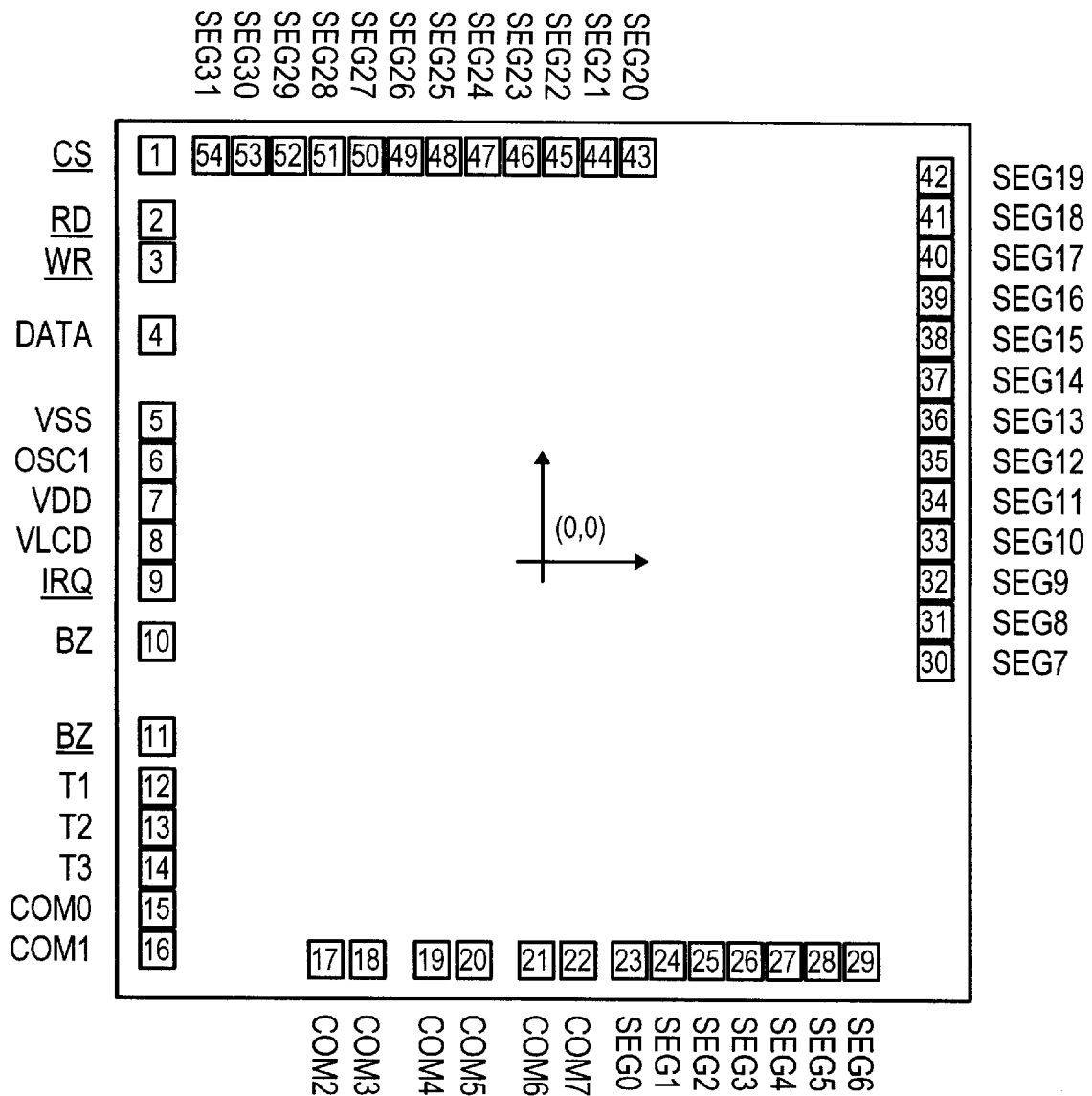
FIG. 5 shows the pad assignment of the LCD driver shown in FIG. 4.
Figure 6:
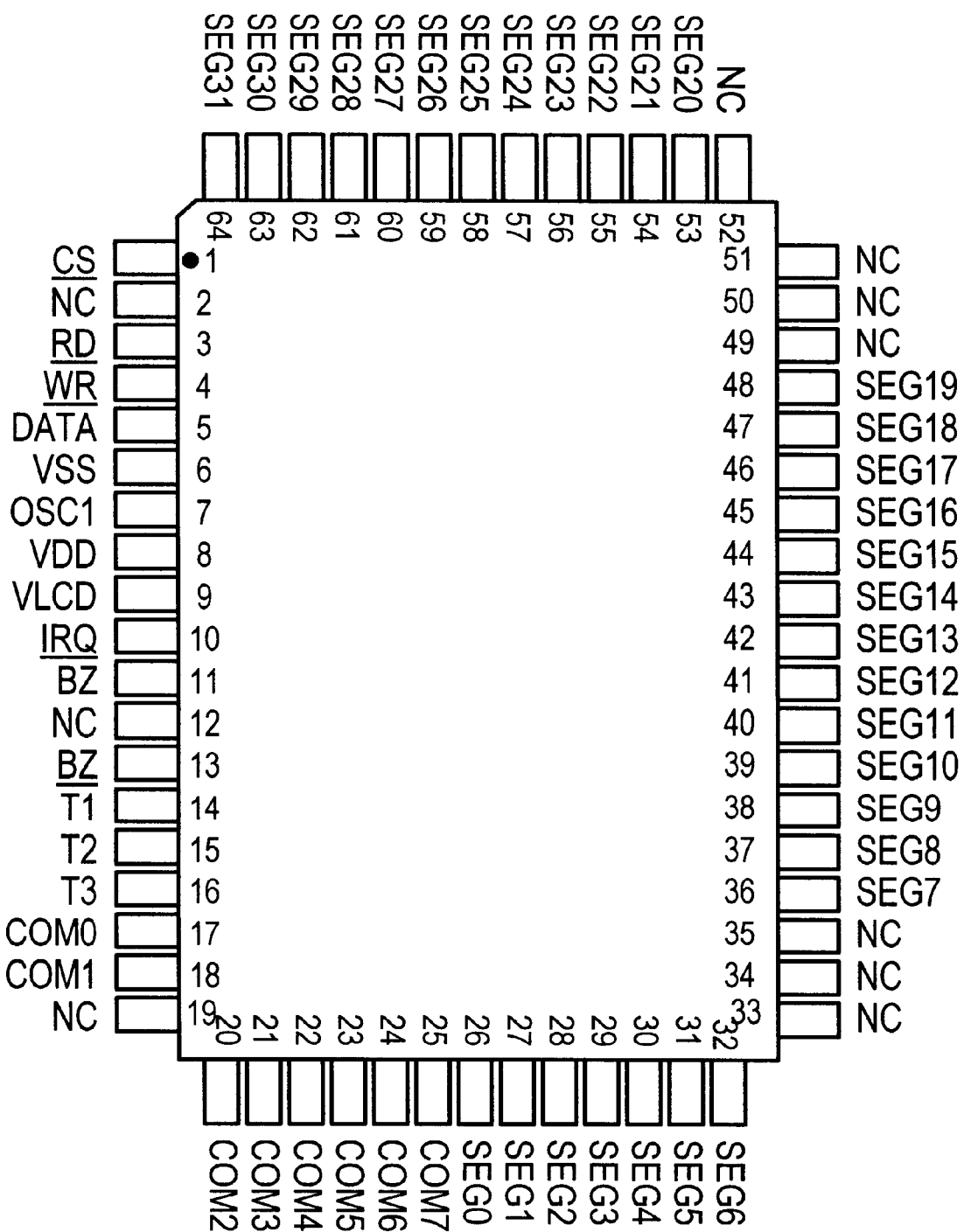
FIG. 6 shows the pin assignment of the LCD driver shown in FIG. 4.

FIGS. 5 and 6 show, respectively, the pad assignment and the pin assignment of the LCD driver/controller 40. The descriptions of the pads are as in Table 1 below:

TABLE 1

| Pad No. | Pad Name | Input (I)/Output(O) | Function |
| --- | --- | --- | --- |
| 1 | CS | I | Chip selection input with Pull-high resistor. When the CS is logic high, the data and command read from or written to the LCD driver/controller 40 are disabled. The serial interface circuit is also reset. But if the CS is at logic low level and is input to the CS pad, the data and command transmission between the chip 34 and the LCD driver 40 are all enabled. |
| 2 | RD | I | READ clock input with Pull-high resistor. Data in the RAM 66 of the LCD driver/controller 40 are clocked out on the rising edge of the RD signal. The clocked out data will appear on the DATA line. The chip 34 can use the next falling edge to latch the clocked out data. |
| 3 | WR | I | WRITE clock input with Pull-high resistor. Data on the DATA line are latched into the LCD driver 40 on the rising edge of the WR signal. |
| 4 | DATA | I/O | Serial data input/output with Pull-high resistor. |
| 5 | VSS | — | Negative power supply, GND (Ground). |
| 6 | OSCI | I | If the system clock comes from an external clock source, the external clock source should be connected to the OSCI pad. |
| 7 | VDD | — | Positive power supply |
| 8 | VLCD | I | LCD operating voltage input pad |
| 9 | IRQ | O | Time base or watch dog timer (WDT) overflow flag, NMOS open drain output |
| 10, 11 | BZ, BZ | O | 2 kHz or 4 kHz tone frequency output pair |
| 12–14 | T1–T3 | I | Not connected |
| 15–22 | COM0–COM7 | O | LCD common outputs |
| 23–54 | SEG0–SEG3 | O | LCD segment outputs. |

Only three lines are required to interface with the LCD driver 40. The CS line is for initializing the serial interface circuit and to terminate the communication between the chip 34 and the LCD driver 40. If the CS pin is set as 1, the data and command issued between the chip 34 and the LCD driver/controller 40 are first disabled and then initialized. Before issuing a mode command or mode switching, a high level pulse is required to initialize the serial interface of the LCD driver/controller 40. The DATA line is the serial data input/output line. Data to be read or written or commands to be written have to be passed through the DATA line. The RD line is the READ clock input. Data in the RAM 60 are clocked out on the falling edge of the RD signal, and the clocked out data will the appear on the DATA line. The WR line is the WRITE clock input. The data, address, and command on the DATA line are all clocked into the LCD driver/controller 40 on the rising edge of the WR signal. There is an optional IRQ line to be used as an interface between the chip 34 and the LCD driver 40. The IRQ pin can be selected as a timer output or a watch dog timer (WDT) overflow flag output by the S/W setting. The chip 34 can perform the time base or the WDT function by being connected with the IRQ pin of the LCD driver 40.

Figures 7, 8:
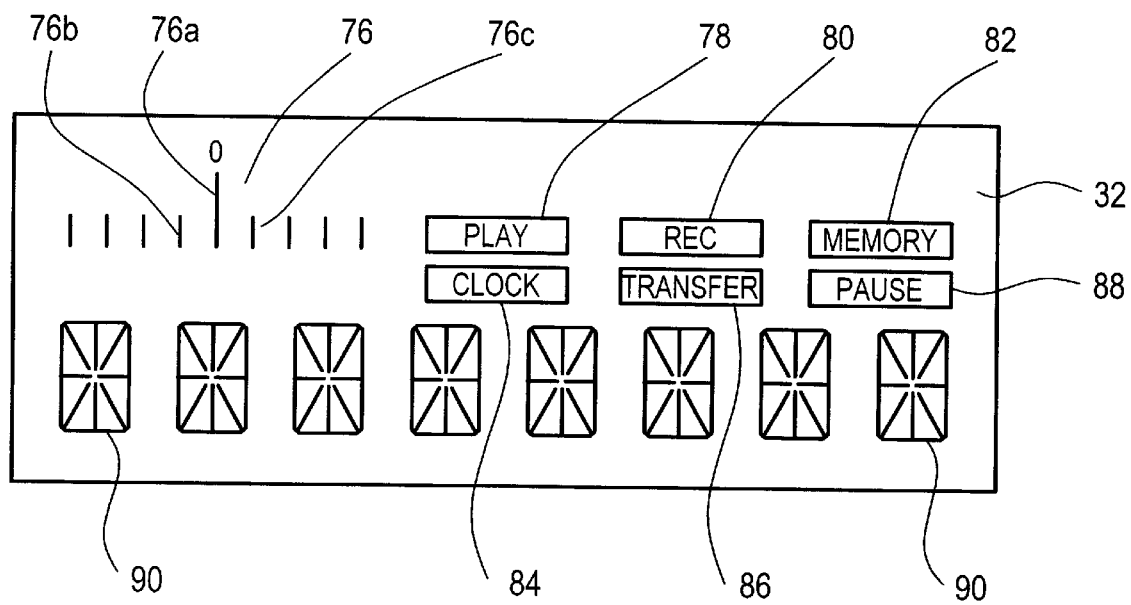
FIG. 7 shows the mapping from the RAM of the LCD driver shown in FIG. 4 to the LCD pattern.
FIG. 8 shows the pattern on the LCD in the apparatus shown in FIG. 1.
Figure 9A:
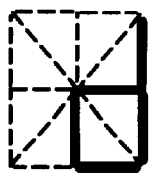
FIGS. 9A to 9H show patterns of the LCD in the apparatus when various notes are inputted into the apparatus shown in FIG. 1.
Figure 9A:
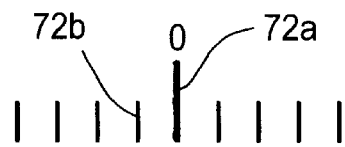
Figure 9B:
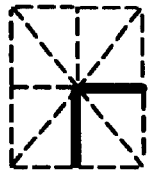
Figure 9B:
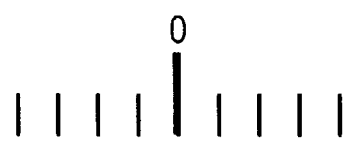
Figure 9C:
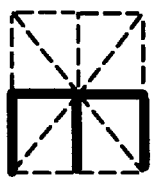
Figure 9C:
Figure 9D:
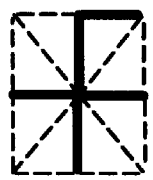
Figure 9D:
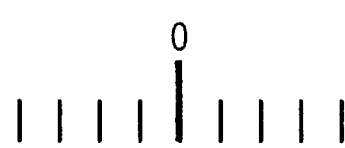
Figure 9E:
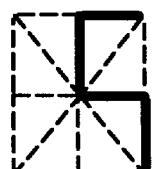
Figure 9E:
Figure 9F:
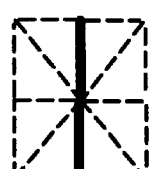
Figure 9F:
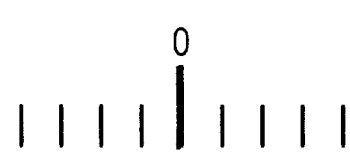
Figure 9G:
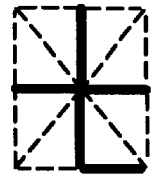
Figure 9G:
Figure 9H:
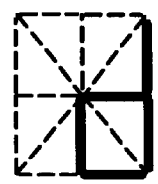
Figure 9H:
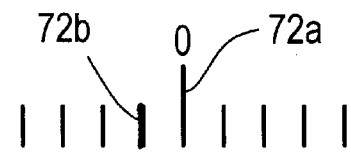

Turning to FIG. 7, such shows the mapping from the RAM 66 of the LCD driver/controller 40 to the LCD pattern. The RAM 66 is organized into 64×4 bits and stores the display data. The contents of the RAM 66 are directly mapped to the contents of the LCD driver/controller 40. Data in the RAM 66 can be accessed by the READ, WRITE, and READ-MODIFY-WRITE commands.

FIG. 8 shows the pattern of the LCD 32 when all the LCD elements are activated and shown. On the top left corner of the LCD 32 is presented a scale 76, with a central higher index 76a, above which is shown a numeral "0". When this index 76a is activated and shown, it means that the note outputted by the apparatus 10 is one in the middle octave. If the note outputted is one in the next higher octave, an index 76b on the left of the index 76a will be activated and shown, and so on. On the other hand, if the note outputted by the apparatus 10 is one in the next lower octave, an index 76c on the right of the index 76a will be activated and shown, and so on.

When the play button 16 is activated, a "PLAY" icon 78 will be shown. When the record button 20 is activated, a "REC" icon 80 will be shown. When the memory button 22 is activated, a "MEMORY" icon 82 will be shown. "CLOCK" icon 84, "TRANSFER" icon 86 and "PAUSE" icon 88 are activatable to be shown to signify that the corresponding function is activated.

The LCD 32 also includes a lower row of eight LCD element units 90. In the present example, representation of a first note outputted by the apparatus 10 will be shown on the left-most LCD element unit of the LCD 32. When a second note is outputted, the next LCD element unit 90 to the right of the first LCD element unit will show the first note previously outputted, while a representation of the note just outputted will be shown by the left-most LCD element unit, and so on.

Turning to FIGS. 9A to 9H, such show the representations of the note "do", "re", "mi", "fa", "so", "la", "ti" and "do". In these figures, solid bolded lines show the LCD elements as actually activated, while the dotted lines show the respectively un-activated LCD elements. It can be seen that, by such an arrangement, the letters of the alphabet "d", "r", "m", "f", "s", "l" and "t" can be visually represented. Attention is also drawn to FIGS. 9A and 9H. While both figures show the letter of the alphabet "d", it can be seen that in FIG. 9A, the index 72a of the scale 76 is activated, thus signifying that this "do" is in the middle octave, whereas in FIG. 9H, the index 72b is activated, thus signifying that this "do" is in the next higher octave. This mode of representation is based on a C major scale. This means that when the apparatus 10 is to output a note of middle-C, it will treat this as the tonic, i.e. "do" (in the C major scale), and the LCD 32 will show a representation of the letter "d" (as in FIG. 9A), as well as an activation of the index 72a. If, on the other hand, when the apparatus 10 is to output a D note in the next higher octave, it will treat this as the supertonic, i.e. "re" (again in the C major scale), and the LCD 32 will show a representation of the letter "r", as well as an activation of the index 72b.

By way of the above arrangement, when the digital signals stored in the RAM 60 of the chip 34 are outputted by the microcontroller 44, the microcontroller 44 also issues instructions to the LCD driver/controller 40 to drive the LCD 32 to output corresponding visual representation of the musical note, e.g. "d", "r", "i", "m", "f", "s", "l", "t". With such representations, even someone not trained with musical theory can write down these representations of his/her tune for future use.

Figure 10:
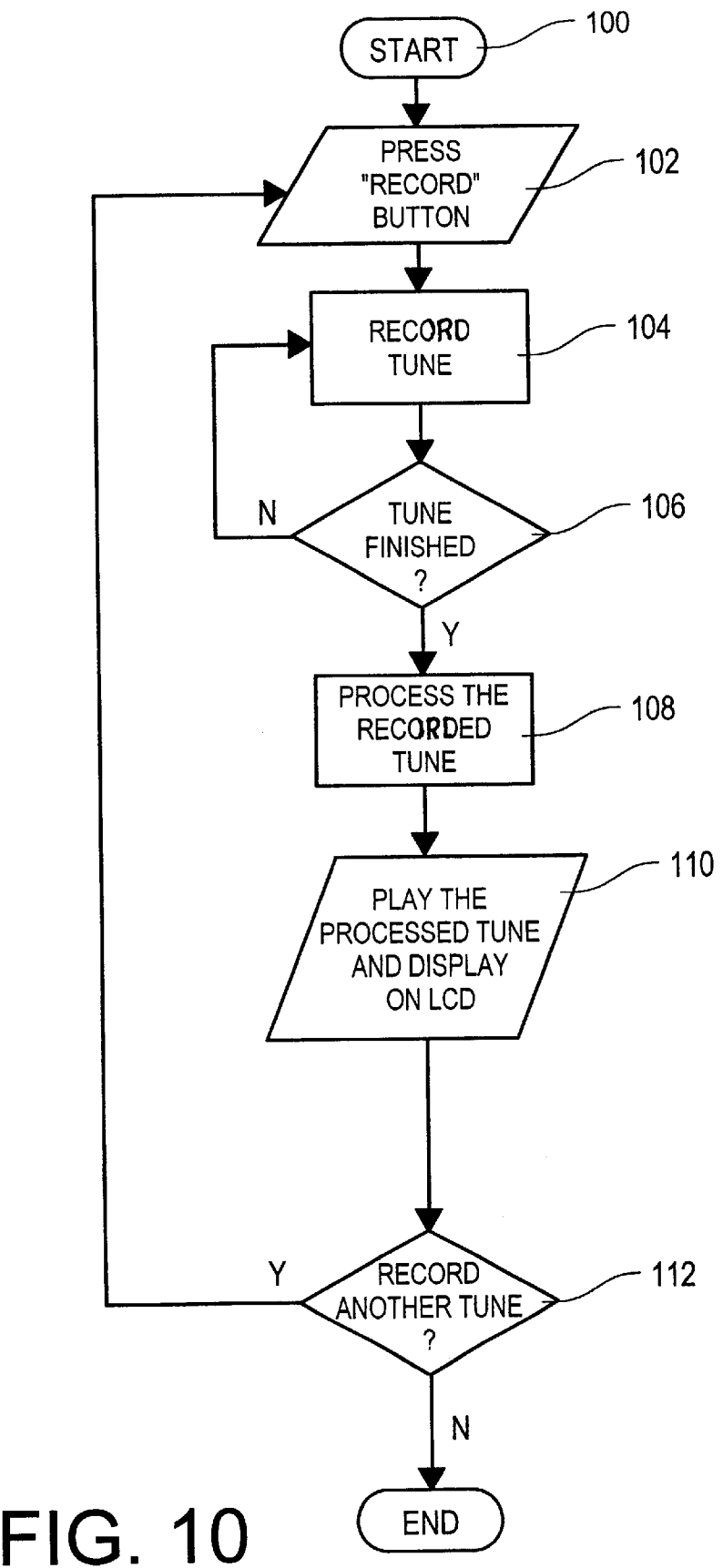
FIG. 10 is a flow chart showing the sequence of operation of the apparatus shown in FIG. 1.

A sequence of operation of the apparatus 10 is shown in the flow chart in FIG. 10. After the apparatus 10 is switched on (step 100), if a recording session is to be commenced, the record button 20 is pressed to activate the record function (step 102). A user may then sing into the microphone 24 using the "da" sound (step 104). The recording will continue while the user keeps on singing. However, when he/she stops for a predetermined period of time, the chip 34 will recognize that the recording is complete (step 106). The chip 34 will then process the inputted audio signals in the manner mentioned above (step 108). The user may re-play the tune/melody as actually sung by him/her by pressing the re-play button 18. He/She may also play the processed tune/melody by pressing the play button 16. A visual representation of the tune/melody so played will also be outputted by the LCD 32 (step 110), in the manner discussed above. The user may record another tune/melody by pressing the record button 20 (step 112), or may stop the operation of the apparatus 10 by switching off the on/off switch 14 (step 114).

What is claimed is:

1. An apparatus for processing at least one analogue audio signal, including means for receiving a first analogue audio signal, means for converting said first analogue signal into a first digital signal, means for comparing said first digital signal with data representing musical notes, means for selecting a datum representing a reference musical note from said data representing musical notes on the basis of result of comparing said first digital signal with said data representing musical notes, means for converting said datum into a second analogue audio signal, means for outputting said second analogue audio signal, and means for visually representing the reference musical note represented by said second analogue audio signal.

2. An apparatus according to claim 1 wherein said apparatus includes means for amplifying said first analogue audio signal before being received by said receiving means.

3. An apparatus according to claim 1 wherein said selecting means includes a microcontroller.

4. An apparatus according to claim 1 wherein said means for visually representing said reference musical note includes a liquid crystal display (LCD) member.

5. An apparatus according to claim 4 wherein said apparatus includes an LCD driver for driving said LCD member.

6. An apparatus according to claim 1 wherein said apparatus includes means for transmitting said second analogue audio signal to an external audio equipment.

7. An apparatus according to claim 2 wherein said selecting means includes a microcontroller.

8. A method of processing at least one analogue audio signal, including the steps of:

(a) receiving a first analogue audio signal;

(b) converting said first analogue audio signal into a first digital signal;

(c) comparing said first digital signal with data representing musical notes;

(d) selecting a datum representing a reference musical note from said data representing musical notes on the basis of result of comparing said first digital signal with said data representing musical notes;

(e) converting said datum into a second analogue audio signal;

(f) outputting said second analogue audio signal; and (g) visually representing the reference musical note represented by said second analogue audio signal.

9. A method according to claim 8 further including a step (h) of amplifying said first set of analogue audio signals.

10. A method according to claim 8 wherein said step (b) is carried out by an analogue-to-digital converter.

11. A method according to claim 8 wherein said step (c) is carried out by a microcontroller.

12. A method according to claim 8 wherein said step (d) is carried out by a microcontroller.

13. A method according to claim 8 wherein said step (e) is carried out by a digital-to-analogue converter.

14. A method according to claim 8 wherein said second analogue audio signal is outputted by a speaker.

15. A method according to claim 8 wherein said step (g) is carried out by a liquid crystal display (LCD) member.

16. A method according to claim 15 wherein said LCD member is driven by an LCD driver.

17. A method according to claim 9 wherein said step (b) is carried out by an analogue-to-digital converter.

* * * * *